(12) United States Patent
Monden et al.

(10) Patent No.: US 11,258,290 B2
(45) Date of Patent: Feb. 22, 2022

(54) POWER SUPPLY APPARATUS

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Yukitaka Monden, Kawasaki (JP); Yoichi Morishima, Sumida (JP)

(73) Assignees: KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/998,331

(22) Filed: Aug. 20, 2020

(65) Prior Publication Data

US 2021/0066951 A1 Mar. 4, 2021

(30) Foreign Application Priority Data

Aug. 26, 2019 (JP) .............................. JP2019-154066

(51) Int. Cl.
*H02J 7/04* (2006.01)
*H02J 7/34* (2006.01)
(Continued)

(52) U.S. Cl.
CPC .................................. *H02J 7/04* (2013.01); *H02J 3/32* (2013.01); *H02J 7/0013* (2013.01); *H02J 7/345* (2013.01);
(Continued)

(58) Field of Classification Search
CPC .... H02J 7/04; H02J 3/32; H02J 7/0013; H02J 2207/50; H02J 1/00; H02M 2001/322; H02M 5/4585; H02P 27/06
See application file for complete search history.

(56) References Cited

U.S. PATENT DOCUMENTS 10,158,319 B2 * 12/2018 Kim .......................... H02P 5/74
2012/0025614 A1 * 2/2012 Taimela .................. H02J 9/062
307/65

(Continued)

FOREIGN PATENT DOCUMENTS

JP 2005-089096 4/2005
JP 2010-273454 12/2010

(Continued)

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

A power supply apparatus includes a control circuit, and first and second power storage connected to a DC link circuit between an inverter and a converter. The control circuit, while the AC power supply is in a normal condition, controls the first power storage to discharge when the control circuit detects that electric power consumption exceeds a threshold, and controls at least one of the first and second power storage to charge when the control circuit detects that the electric power consumption does not exceed the threshold, and while the AC power supply is in an abnormal condition, controls the second power storage to discharge, and controls the first power to discharge when it is detected that the electric power consumption exceeds the threshold.

15 Claims, 8 Drawing Sheets

(51) Int. Cl.
*H02J 7/00* (2006.01)
*H02J 3/32* (2006.01)
*H02P 27/06* (2006.01)

(52) U.S. Cl.
CPC ....... *H02J 2207/20* (2020.01); *H02J 2207/50* (2020.01); *H02P 27/06* (2013.01)

(56) References Cited

U.S. PATENT DOCUMENTS

2013/0278216 A1\* 10/2013 Son ................ H02J 7/0024
320/112
2020/0395771 A1\* 12/2020 Hiratsuka ............... H02J 9/062

FOREIGN PATENT DOCUMENTS

| | | |
|---|---|---|
| JP | 2011-188706 | 9/2011 |
| JP | 2014-220896 | 11/2014 |
| JP | 5877480 | 2/2016 |
| JP | 6183465 | 8/2017 |

\* cited by examiner

POWER SUPPLY APPARATUS

CROSS-REFERENCE TO RELATED APPLICATION(S)

This application is based upon and claims the benefit of priority from Japanese Patent Application No. 2019-154066, filed Aug. 26, 2019, the entire contents of which are incorporated herein by reference.

FIELD

Embodiments relate to a power supply apparatus.

BACKGROUND

When a large amount of electric power is directly supplied from a power supply system, such as a commercial power supply, to an electric load that transiently consumes the large amount of electric power, the electric current flowing through the power receiving equipment increases, and as a result the electricity rate may increase.

On the other hand, a system including a power storage unit has been known. According to such a system, when the electric load consumes a large amount of electric power, electric power to be received from the power supply system can be decreased to a preferable level by supplying electric power from the power storage unit to the electric load. In addition, it has been studied to improve a peak shift operation to the electric power supplied from the power supply system by using different types of power storage units in a system.

DETAILED DESCRIPTION

Hereinafter, a power supply apparatus of a plurality of embodiments will be described with reference to the drawings. However, it is to be understood that the embodiments are merely examples and other embodiments may take various and alternative forms. Therefore, specific structural and functional details disclosed herein are not to be interpreted as limiting, but merely as a representative basis for teaching a person skilled in the art to variously employ the embodiments. As those of ordinary skill in the art will understand, various features illustrated and described with reference to any one of the figures may be combined with features in one or more other figures to produce representative embodiments for typical applications. Various combinations and modifications of the features consistent with the teachings of this disclosure, however, could be desired for particular applications or implementations.

According to embodiments, a power supply apparatus includes a control circuit, a converter, an inverter, and first and second power storage units. The converter converts first AC electric power, received from an AC (Alternate Current) power supply, into DC (Direct Current) electric power. The inverter is connected to the converter via a DC link circuit and converts the DC electric power into second AC electric power. The first power storage unit, electrically connected to the DC link circuit, supplies and receives DC electric power to and from the DC link circuit. The second power storage unit, having a larger electric power storing capacity than the first power storage unit and electrically connected to the DC link circuit, supplies and receives DC electric power to and from the DC link circuit. The control circuit, while the AC power supply is in a normal condition, controls the first power storage unit to discharge when the control circuit detects that electric power consumption exceeds a threshold, and controls at least one of the first power storage unit or the second power storage unit to charge when the control circuit detects that the electric power consumption does not exceed the threshold, and while the AC power supply is in an abnormal condition, controls the second power storage unit to discharge, and controls the first power unit to discharge when it is detected that the electric power consumption exceeds the threshold.

Figure 1:
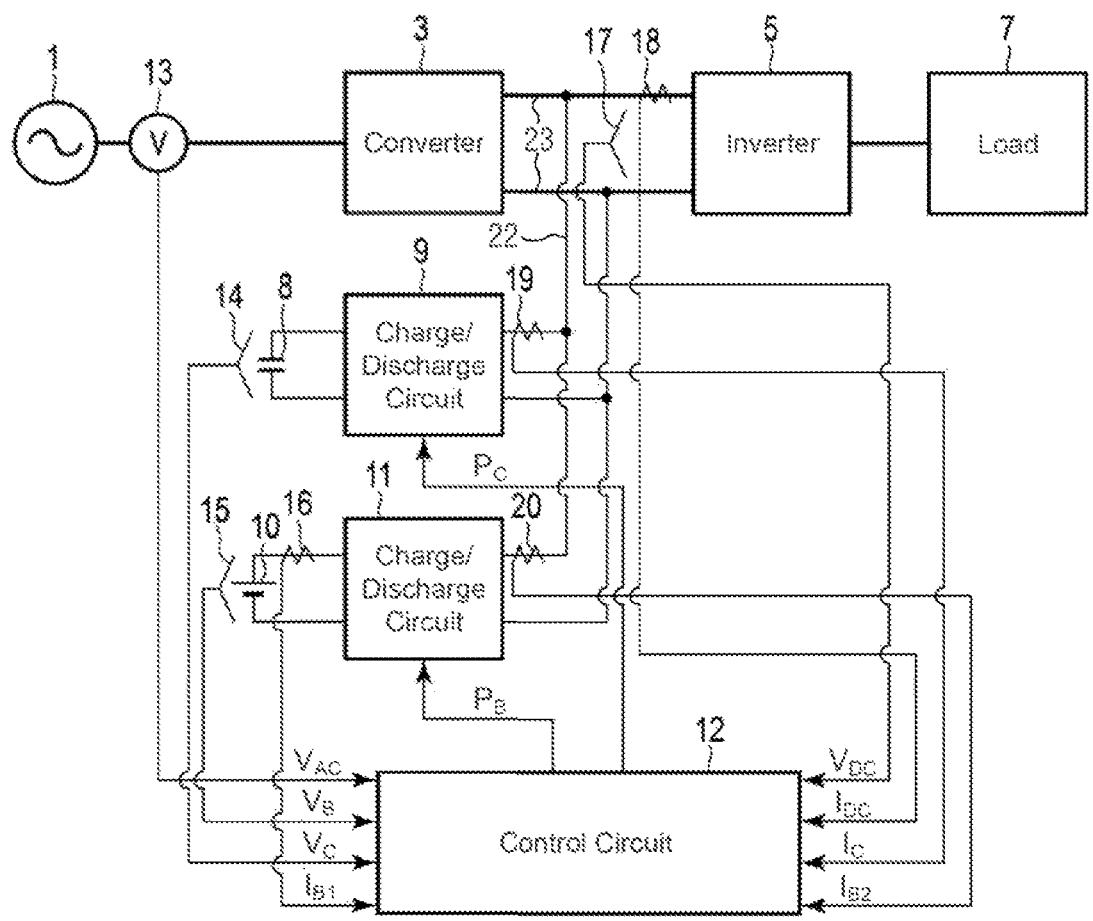
FIG. 1 is an exemplary diagram showing a power supply apparatus of a first embodiment.

FIG. 1 is an exemplary diagram showing a power supply apparatus of a first embodiment. The power supply apparatus of the first embodiment is a system that is connected between a commercial power supply 1 and an electric load 7 such as a drive equipment of an elevator, a microwave oven used in commercial facilities, a computed tomography (CT) system, a magnetic resonance imaging (MRI) system, etc. and that executes a peak shift operation such that the AC power supplied from the commercial power supply 1 does not exceed a predetermined threshold.

The power supply apparatus of the first embodiment includes a converter 3, an inverter 5, a first power storage unit 8, 9, a second power storage unit 10, 11, a control circuit 12, voltage detectors 13, 14, 15, and 17, and current detectors 16, 18, 19, and 20. The first power storage unit includes a capacitor 8 and a charge/discharge circuit 9 for the capacitor 8. The second power storage unit includes a secondary battery unit 10 and a charge/discharge circuit 11 for the secondary battery unit 10.

The converter 3 is electrically connected to the commercial power supply 1 via an AC line. The converter 3 converts AC electric power supplied from the commercial power supply 1 into DC power and outputs the DC electric power to lines acting as a DC link circuit 23. The converter 3 is controlled, for example, to keep the DC voltage output to the DC link circuit 23 at a constant voltage. When the DC voltage falls below the constant voltage, the converter 3 increases the electric power received from the commercial power supply 1 so that the DC voltage comes to the constant voltage. On the other hand, when the DC voltage exceeds the constant voltage, the converter 3 decreases the electric power received from the commercial power supply 1. The commercial power supply 1 can be a single-phase AC power supply or a three-phase AC power supply.

The inverter 5 is electrically connected to the converter 3 via the DC link circuit 23, and is electrically connected to the electric load 7 via an AC line. The Inverter 5 converts the DC power, output by the converter 3, into AC power, and outputs the AC power to the electric load 7. The inverter 5 generates AC power with a level required by the electric load 7.

The charge/discharge circuit 9 of the first power storage unit and the charge/discharge circuit 11 of the second power storage unit are both electrically connected to the DC link circuit 23 through a common DC line 22. The charge/discharge circuit 9 and charge/discharge circuit 11 supply electric power (DC power) to the DC link circuit 23 through the common DC line 22, and receive electric power (DC power) supplied through the DC link circuit 23 and the common DC line 22.

The operation of the charge/discharge circuit 9 is controlled by a control signal $P_C$ received from the control circuit 12. The charge/discharge circuit 9 charges the capacitor 8 with the electric power supplied through the common DC line 22, and supplies electric power, based on energy stored in the capacitor 8, to the common DC line 22.

The operation of the charge/discharge circuit 11 is controlled by a control signal $P_B$ received from the control circuit 12. The charging/discharging circuit 11 charges the secondary battery unit 10, including a plurality of battery cells, with the electric power supplied through the DC line 22, and supplies electric power, based on energy stored in the secondary battery unit 10, to the DC line 22.

In the power supply apparatus of the present embodiment, the capacitor 8 can be charged and discharged in a shorter time than the secondary battery unit 10. In other words, the secondary battery unit 10 is charged and discharged for a longer time than the capacitor 8. Further, it is desirable that the secondary battery unit 10 has a larger capacity than the capacitor 8 so that the secondary battery unit 10 supplies the electric power required by the electric load 7 while the commercial power supply 1 is in a power failure condition.

The voltage detector 13 detects a voltage value $V_{AC}$ of the AC line connected between the commercial power supply 1 and the converter 3. The voltage detector 14 detects voltage value $V_C$ of the capacitor 8. The voltage detector 15 detects voltage value $V_B$ of the secondary battery unit 10. The voltage detector 17 detects voltage value $V_{DC}$ of the DC link circuit 23. The voltage detectors 13, 14, 15, and 17 supply the detected voltage values to the control circuit 12.

The current detector 16 detects a current value $I_{B1}$ of a charge current to and a discharge current from the secondary battery unit 10. The current detector 18 detects a current value $I_{DC}$ of a current flowing between the DC link circuit 23 and the inverter 5. The current detector 19 detects a current value $I_C$ of a current flowing between the capacitor charge/discharge circuit 9 and the DC line 22. The current detector 20 detects a current value $I_{B2}$ of a current flowing between the charge/discharge circuit 11 and the DC line 22. The current detectors 16, 18, 19, and 20 supply the detected current values to the control circuit 12.

The control circuit 12 includes, for example, at least one processor such as a central processing unit (CPU) or a micro processing unit (MPU), and a memory in which a program executed by the processor is stored.

Figure 2:
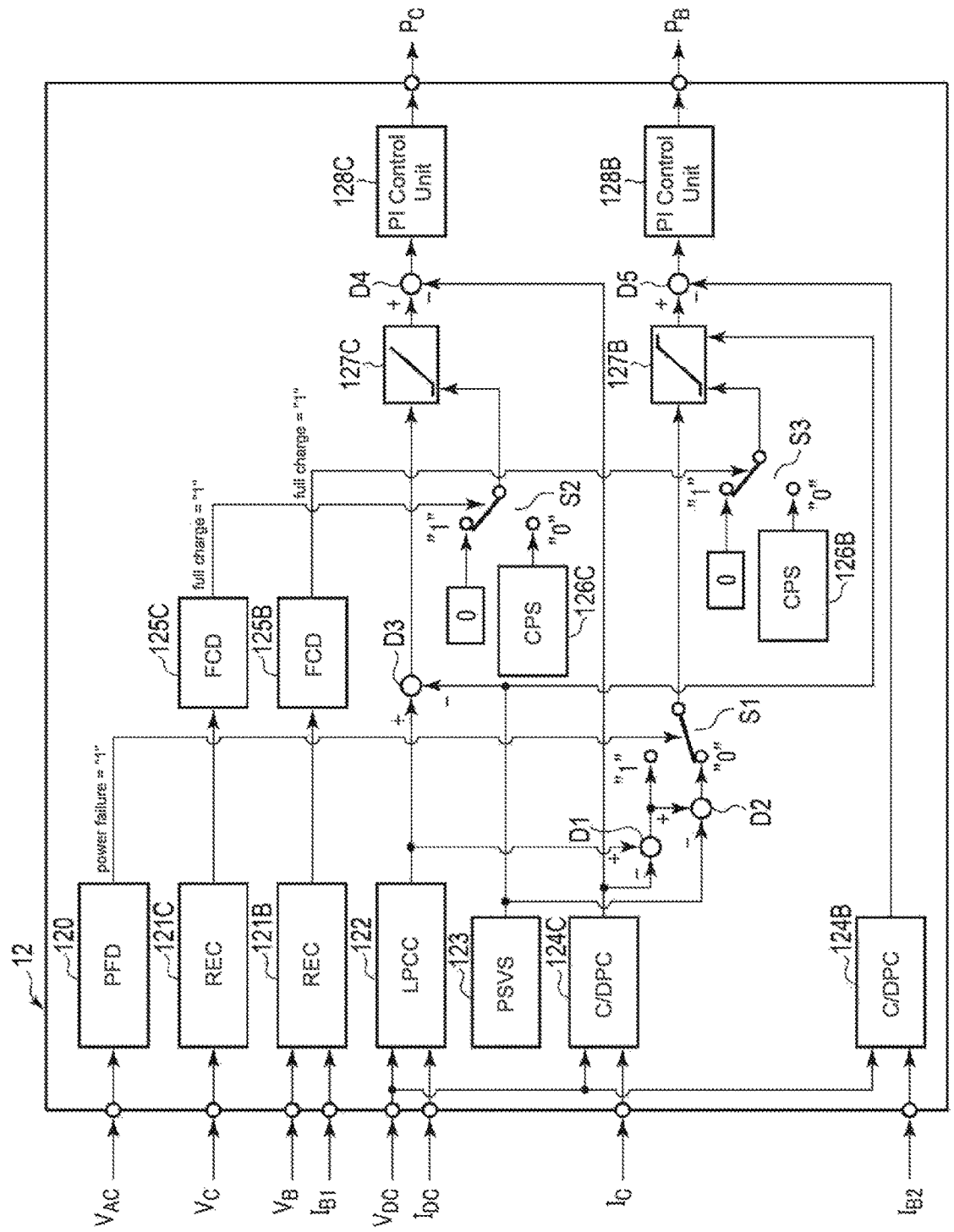
FIG. 2 is an exemplary diagram of a control circuit for the power supply apparatus of the first embodiment.

FIG. 2 is an exemplary diagram of the control circuit 12 of the power supply apparatus of the first embodiment. In the following description, the electric power value indicates a positive value when the electric power is discharged from each of the capacitor 8 and the secondary battery unit 10, and the electric power value indicates a negative value when the electric power is charged to each of the capacitor 8 and the secondary battery unit 10. Also, the electric power consumed by the electric load 7 indicates a positive value.

The control circuit 12 includes a power failure detection unit (PFD) 120, remaining energy calculation units (RECs) 121C and 121B, a load power consumption calculation unit (LPCC) 122, a peak shift value setting unit (PSVS) 123, charge/discharge power calculation units (C/DPCs) 124C and 124B, full charge determination units (FCDs) 125C and 125B, charge power setting units (CPSs) 126C and 126B, charge power limiter 127C, charge/discharge power limiter 127B, PI (Proportional-Integral) control units 128C and 128B, subtractors D1-D5, and switching units S1-S3.

The power failure detection unit 120 receives the voltage value $V_{AC}$ output from the voltage detector 13, and determines whether or not the commercial power supply 1 is in the power failure condition based on the received voltage value $V_{AC}$. The power failure detection unit 120 outputs a signal "0" when it is determined that the commercial power supply 1 is not in the power failure condition, and outputs a signal "1" when it is determined that the commercial power supply 1 is in the power failure condition. For example, the power failure detection unit 120 determines whether or not the commercial power supply 1 is in the power failure condition by comparing the voltage value $V_{AC}$ with a preset power failure determination threshold. Here, the power failure condition indicates one of a plurality of abnormal conditions with respect to the commercial power supply 1.

The remaining energy calculation unit 121C receives the voltage value $V_C$ output from the voltage detector 14, calculates a remaining energy value of the capacitor 8 based on the received voltage value $V_C$, and outputs the remaining energy value to the full charge determination unit 125C. The remaining energy value can be represented by a percentage value. For example, the remaining energy calculation unit 121C determines the percentage value as 100% when the received voltage value $V_C$ corresponds to a full charge value, and calculates the percentage value based on the ratio of the received voltage value $V_C$ to the full charge value.

The remaining energy calculation unit 121B receives the voltage value $V_B$ output from the voltage detector 15 and the current value $I_{B1}$ output from the current detector 16, and calculates a remaining energy value, e.g. SOC (State Of Charge), based on the input voltage value $V_B$ and current value $I_{B1}$. The remaining energy value can be represented by a percentage value. For example, the remaining energy calculation unit 121B determines the percentage value as 100% when the received voltage value $V_B$ correspond to a full charge value of the secondary battery unit 10, and calculates the percentage value by adjusting the accumulated current value $I_{B1}$ with the received voltage value $V_B$.

The load power consumption calculation unit 122 receives the current value $I_{DC}$ output from the current detector 18 and the voltage value $V_{DC}$ output from the voltage detector 17, and calculates an electric power consumption value by the electric load 7, corresponding to the electric power supplied from the DC link circuit 23 to the inverter 5, based on the received current value $I_{DC}$ and voltage value $V_{DC}$.

In the power supply system of the present embodiment, the peak shift value setting unit 123 outputs a peak shift value indicating the maximum value of the electric power supplied from the commercial power supply 1 to the electric load 7. The peak shift value is a predetermined threshold. When the electric power consumption by the electric load 7, that is, the electric power supplied from the DC link circuit to the inverter 5, exceeds the peak shift value, the control circuit 12 controls the charge/discharge circuit 9 and the charge/discharge circuit 11 to supply the electric power, for compensating the excess electric power, from the capacitor 8 and the secondary battery unit 10 to keep the electric power supplied from the commercial power supply 1 below the peak shift value. On the other hand, when the electric power consumption by the electric load 7, that is, the electric power supplied via the DC link circuit to the inverter 5, is less than the peak shift value, the control circuit 12 may, using the surplus electric power, control the charge/discharge circuit 9 and the charge/discharge circuit 11 to charge the capacitor 8 and the secondary battery unit 10.

The charge/discharge power calculation unit 124C receives the voltage value $V_{DC}$ output from the voltage detector 17 and the current value $I_C$ output from the current detector 19, and calculates and outputs a charge power value or a discharge power value of the capacitor 8.

The charge/discharge power calculation unit 124B receives the voltage value $V_{DC}$ supplied from the voltage detector 17 and the value $I_{B2}$ supplied from the current detector 20, and calculates and outputs a charge power value or a discharge power value of the secondary battery unit 10.

The full charge determination unit 125C receives the remaining energy value of the capacitor 8 from the remaining energy calculation unit 121C, and determines whether or not the capacitor 8 is fully charged. The full charge determination unit 125C outputs a signal "0" when it is determined that the capacitor 8 is not fully charged, and outputs a signal "1" when it is determined that the capacitor 8 is fully charged.

The full charge determination unit 125B receives the remaining energy value of the secondary battery unit 10 from the remaining energy calculation unit 121B, and determines whether or not the secondary battery unit 10 is fully charged. The full charge determination unit 125B outputs a signal "0" when it is determined that the secondary battery unit 10 is not fully charged, and outputs a signal "1" when it is determined that the secondary battery unit 10 is fully charged.

The subtractor D3 outputs a value obtained by subtracting the output value of the peak shift value setting unit 123 from the output value of the load power consumption calculation unit 122. That is, the value output from the subtractor D3 indicates a difference between the peak shift value and the power consumption value consumed by the electric load 7. When the output value of the subtractor D3 is a positive value, the output value of the subtractor D3 indicates the electric power that needs to be supplied from the power supply apparatus of the present embodiment to the electric load 7. On the other hand, when the output value of the subtractor D3 is a negative value, the output value of the subtractor D3 indicates the electric power that can be used to charge the capacitor 8 and/or the secondary battery unit 10.

The subtractor D1 outputs a value obtained by subtracting the output value of the charge/discharge power calculation unit 124C from the output value of the load power consumption calculation unit 122. The output value of the subtractor D1 indicates the difference between electric power consumed by the electric load 7 and electric power discharged from the capacitor 8. That is, the output value of the subtractor D1 indicates the remaining electric power which should additionally be supplied by the capacitor 8 in a case that the entire electric power consumed by the electric load 7 is to be supplied by the capacitor 8.

The subtractor D2 outputs a value obtained by subtracting the output value of the peak shift value setting unit 123 from the output value of the subtractor D1. When the output value of the subtractor D2 is a positive value, the total electric power supplied from the commercial power supply 1 and the capacitor 8 to the electric load 7 exceeds the peak shift value, and the output value indicates the electric power amount exceeding the peak shift value. That is, the output value of the subtractor D2 indicates electric power that the power supply apparatus needs to further supply. On the other hand, when the output value of the subtractor D2 is a negative value, the total electric power supplied from the commercial power supply 1 and the capacitor 8 to the electric load 7 is less than the peak shift value. That is, the output value of the subtractor D2 indicates a surplus with respect to the peak shift value. In that case, the surplus can be supplied from the DC link circuit 21 to the power supply apparatus to charge the power supply apparatus.

The switching unit S1 includes a first input terminal, a second input terminal, and an output terminal. The output value of the subtractor D1 is input to the first input terminal. The output value of the subtractor D2 is input to the second input terminal. The switching unit S1 switches the connection between the output terminal and the two input terminals based on the output value of the power failure detection unit 120. The switching unit S1 connects the first input terminal and the output terminal when the output value of the power failure detection unit 120 is a signal "1". On the other hand, the switching unit S1 connects the second input terminal and the output terminal when the output of the power failure detection unit 120 is a signal "0".

The switching unit S2 includes a first input terminal, a second input terminal, and an output terminal. As a capacitor charge limit value, a value "0" is input to the first input terminal. On the other hand, the output value, indicating electric power to be charged, from the charge power setting unit 126C is input to the second input terminal.

The switching unit S2 switches the connection between the output terminal and the two input terminals based on the output value from the full charge determination unit 125C. The switching unit S2 connects the first input terminal and the output terminal when the full charge determination unit 125C outputs a signal "1". The full charge determination unit 125C outputs the signal "1" when it is determined that the capacitor 8 is fully charged. On the other hand, the switching unit S2 connects the second input terminal and the output terminal when the full charge determination unit 125C outputs a signal "0". The full charge determination unit 125C outputs the signal "0" when it is determined that the capacitor 8 is not fully charged. That is, the switching unit S2 selectively outputs one of the capacitor limit value or the output value from the charge power setting unit 126C based on the output value from the full charge determination unit 125C.

The switching unit S3 includes a first input terminal, a second input terminal, and an output terminal. As a battery charge limit value, a value "0" is input to the first input terminal. On the other hand, the output value, indicating electric power to be charged, from the charge power setting unit 126B is input to the second input terminal.

The switching unit S3 switches the connection between the output terminal and the two input terminals based on the output value from the full charge determination unit 125B. The switching unit S3 connects the first input terminal and the output terminal when the full charge determination unit 125B outputs a signal "1". The full charge determination unit 125B outputs the signal "1" when it is determined that the secondary battery unit 10 is fully charged. On the other hand, the switching unit S3 connects the second input terminal and the output terminal when the full charge determination unit 125B outputs a signal "0". The full charge determination unit 125B outputs the signal "0" when it is determined that the secondary battery unit 10 is not fully charged. That is, the switching unit S3 selectively outputs one of the battery limit value or the output value from the charge power setting unit 126B based on the output value from the full charge determination unit 125B.

The charge power limiter 127C receives the output value from the subtractor D3 and the output value from the switching unit S2. The charge power limiter 127C outputs a value "0" when the output value of the switching unit S2 is the value "0". On the other hand, when the output value of the switching unit S2 is not the value "0", the charge power limiter 127C outputs the output value from the subtractor D3 when the output value of the charge power setting unit 126C is larger than or equal to the output value of the subtractor D3, and outputs the output value from the charge power setting unit 126C when the output value of the subtractor D3 is larger than the output value of the charge power setting unit 126C. That is, the charge power limiter 127C limits the output value from the subtractor D3 so that the output value from the subtractor D3 does not exceed the output value from the switching unit S2.

The charge/discharge power limiter 127B receives the peak shift value from the peak shift value setting unit 123, the output value from the switching unit S1, and the output value from the switching unit S3. The charge/discharge power limiter 127B outputs, when the output from the switching unit S1 is a positive value, a discharge electric power value for the secondary battery unit 10, and outputs, when the output from the switching unit S1 is a negative value, a charge electric power value for the secondary battery unit 10. In that case, the charge/discharge power limiter 127B limits the electric power charging the secondary battery unit 10 not to exceed the output value from the switching unit S3, and limits the electric power discharged from the secondary battery unit 10 not to exceed the peak shift value.

When the output value from the switching unit S1 is a negative value and the output value from the switching unit S3 is the value "0", the charge/discharge power limiter 127B outputs a value "0" as the charge electric power value for the secondary battery unit 10. On the other hand, when the output value from the switching unit S1 is a positive value and the output value of the switching unit S3 is not the value "0", the charge/discharge power limiter 127B limits the electric power used for charging the secondary battery unit 10 so as not to exceed the output value of the switching unit S3.

In a case that the commercial power supply 1 is operating normally, e.g. not in a power failure condition, the output value from the switching unit S1 to the charge/discharge power limiter 127B is calculated by subtracting both of the peak shift value and the output value of the discharge power calculation unit 124C from the output value of the load power consumption calculation unit 122. That is, when the output value from the switching unit S1 to the charge/discharge power limiter 127B is a positive value, that indicates the electric power supplied by the capacitor 8 cannot make up for electric power exceeding the peak shift value, and that an absolute value of the output value of the switching unit S1 is an electric power exceeding the discharge capacity of the capacitor 8. On the other hand, when the output value from the switching unit S1 to the charge/discharge power limiter 127B is a negative value, that indicates the sum of the electric power consumed by the electric load 7 and electric power used to charge the capacitor 8 does not exceed the peak shift value. In that case, an absolute value of the output value of the switching unit S1 indicates the maximum electric power that can be used to charge the secondary battery unit 10.

When the commercial power supply 1 is in the power failure condition, the output value from the switching unit S1 to the charge/discharge power limit unit 127B indicates a value obtained by subtracting the output value of the charge/discharge power calculation unit 124C from the output value of the load power consumption calculation unit 122. That is, when the output value from the switching unit S1 to the charge/discharge power limit unit 127B is a positive value, the output value from the switching unit S1 indicates the difference between the electric power consumed by the electric load 7 and the electric power discharged from the capacitor 8, or indicates the sum of the electric power consumed by the electric load 7 and the electric power charged to the capacitor 8.

That is, when the commercial power supply 1 is in the power failure condition and also the electric power consumed by the electric load 7 does not exceed the peak shift value, the electric power supplied by the secondary battery unit 10 can be used not only for the consumption by the electric load 7, but also for the charge to the capacitor 8. Thus, after the commercial power supply 1 recovers from the power failure, even when the electric load 7 consumes a large electric power exceeding the peak shift value, the peak shift operation can be executed by supplying electric power from the capacitor 8. Further, after the commercial power supply 1 recovers from the power failure, the secondary battery unit 10 can be charged by the electric power supplied via the DC link circuit 23 while the electric power consumed by the electric load 7 stays under the peak shift value.

Further, when the output value from the switching unit S1 to the charge/discharge power limit unit 127B is a negative value, that indicates the electric power consumed by the electric load 7 is smaller than the electric power discharged by the capacitor 8. However, since the capacitor 8 is controlled so that the electric power discharged from the capacitor 8 is used to make up for electric power that exceeds the peak shift value, there is no case that the output value of the switching unit S1 becomes a negative value.

The subtractor D4 outputs a difference obtained by subtracting the output value of the charge/discharge power calculation unit 124C from the output value of the charge power limit unit 127C.

The PI control unit 128C receives the output value of the subtractor D4, and calculates a control amount based on the proportional-integral calculation such that the output value of the subtractor D4 becomes zero. Thereafter, the PI control unit 128C outputs the control amount as the control signal $P_C$.

The subtracter D5 outputs a difference obtained by subtracting the output value of the charge/discharge power calculation unit 124B from the output value of the charge/discharge power limit unit 127B.

The PI control unit 128B receives the output value of the subtractor D5, and calculates a control amount based on the proportional-integral calculation such that the output value input of the subtractor D5 becomes zero. Thereafter, the PI control unit 128B outputs the control amount as the control signal $P_B$.

With the configuration of the control circuit 12 and the operations executed by the control circuit 12, when the commercial power supply 1 is operating normally and the electric power to be supplied to the electric load 7 includes the excess electric power exceeding the peak shift value, such excess electric power can be compensated by the electric power discharged by the capacitor 8.

Also, when the commercial power supply 1 is in the power failure condition and the electric power consumed by the electric load 7 does not exceed the peak shift value, the electric power consumed by the electric load 7 is supplied by the secondary battery unit 10. In that case, the electric power supplied by the secondary battery unit 10 can be used to charge the capacitor 8 to prepare for the peak shift operation. On the other hand, when the commercial power supply 1 is in the power failure condition and the electric power consumed by the electric load 7 exceeds the peak shift value, the electric power exceeding the peak shift value is compensated by the electric power supplied by the capacitor 8.

As described above, according to the power supply device of the present embodiment, the capacitor 8 and the secondary battery unit 10 can operate in cooperation with each other, and the energy stored in the plurality of power storage devices can be efficiently used.

Next, a power supply device according to a second embodiment will be described with reference to the drawings.

In the following description, the same components as those of the power supply device of the first embodiment are denoted by the same reference numerals, and description thereof is omitted.

Figure 3:
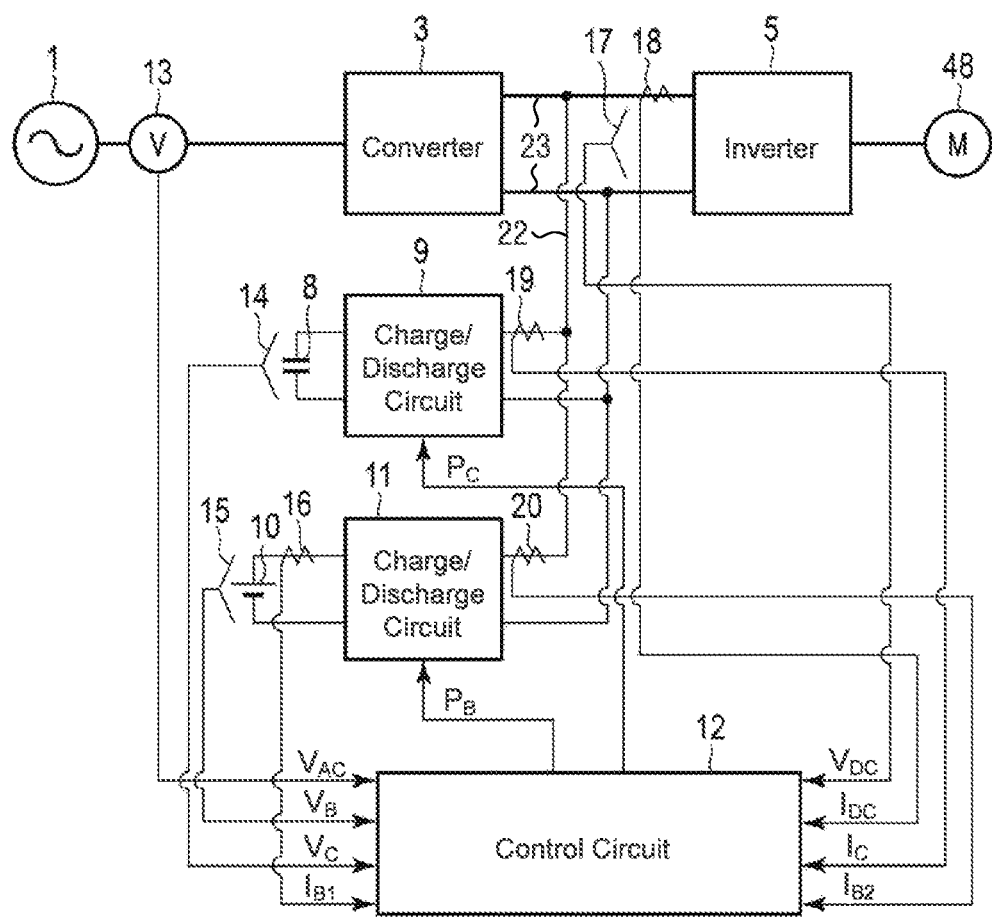
FIG. 3 is an exemplary diagram showing a power supply apparatus of a second embodiment.

FIG. 3 is an exemplary diagram showing a power supply apparatus of the second embodiment.

The power supply apparatus of the present second embodiment is different from the power supply apparatus of the first embodiment in that a motor 48 is provided instead of the electric load 7. In the power supply apparatus of the present embodiment, electric power is regenerated when the motor 48 performs the braking operation.

Figure 4:
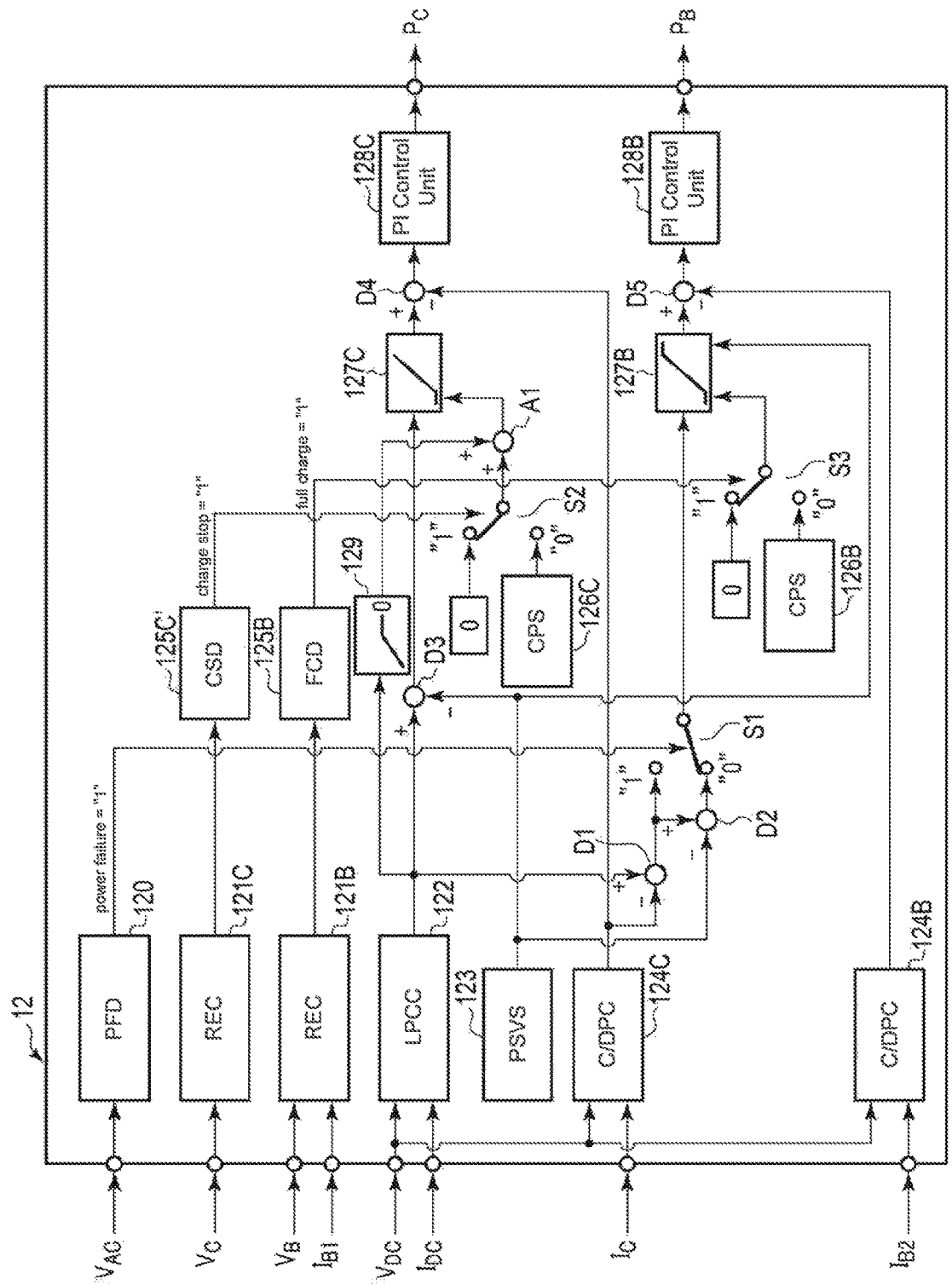
FIG. 4 is an exemplary diagram of a control circuit for the power supply apparatus of the second embodiment.
Figure 5:
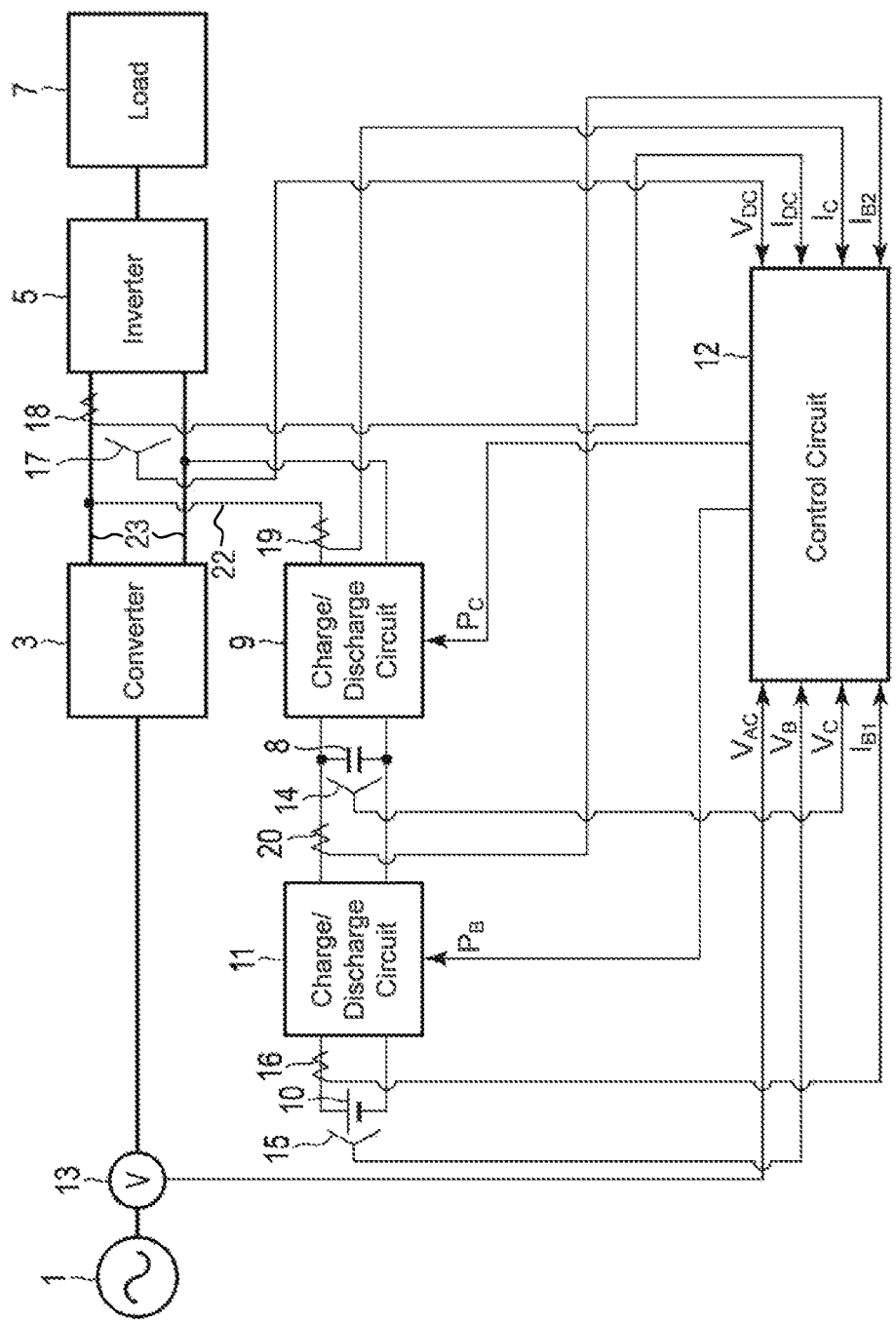
FIG. 5 is an exemplary diagram showing a power supply apparatus of a third embodiment.

FIG. 4 is an exemplary diagram of a control circuit for the power supply apparatus of the second embodiment. In the following description, the electric power value indicates a positive value when electric power is consumed by the motor 48, and the electric power value indicates a negative value when electric power is supplied to the power supply apparatus based on regenerated electric power of the motor 48.

The power supply apparatus according to the present second embodiment is different from the power supply apparatus according to the first embodiment in that the control circuit 12 includes a charge stop determination unit (CSD) 125C', a limiter 129, and an adder A1.

The charge stop determination unit 125C' receives an output value from the remaining energy amount calculation unit 121C. The charge stop determination unit 125C' outputs a charge stop signal "1" when remaining energy of the capacitor 8 becomes equal to or greater than a predetermined threshold. The threshold used in the charge stop determination unit 125C' is obtained by subtracting physical energy corresponding to the regenerative electric power by the motor 48 from energy of the capacitor 8 when the capacitor 8 is fully charged.

The limiter 129 receives an output value of the load power consumption calculation unit 122. The limiter 129 outputs a negative value when the output value of the load power consumption calculation unit 122 is negative. That is, when the electric power is regenerated by the motor 48, the limiter 129 outputs the negative value corresponding to the regenerative electric power. On the other hand, the limiter 129 outputs a zero value when the output value of the load power consumption calculation unit 122 is zero or more.

The adder A1 receives the output value of the switching unit S2 and the output value of the limiter 129, and outputs the sum of the output value of the switching unit S2 and the output value of the limiter 129. The output value of the adder A1 is input to the charge power limiter 127C. That is, in the power supply apparatus of the present second embodiment, in a case that a negative value is output by the limiter 129 while the output value of the switching unit S2 is zero responding to the charge stop signal "1", a value, input to the charge power limiter 127C, for limiting the charge to the capacitor 8 comes to non-zero. Then, the charge limitation to the capacitor 8 is released.

Thus, the capacitor 8 can be charged when the electric power is regenerated by the motor 48, and it is possible to avoid the occurrence of reverse electric power flow to the commercial power supply 1. Further, energy of the regenerative electric power stored in the capacitor 8 can be used for the power consumption of the motor 48, and the energy can be used efficiently.

The power supply apparatus of the present second embodiment is the same as the power supply apparatus of the first embodiment except for the above points. That is, according to the power supply apparatus of the present second embodiment, the capacitor 8 and the secondary battery unit 10 can operate in cooperation with each other, and the energy stored in the plurality of power storage devices can be efficiently used.

Next, a power supply apparatus according to a third embodiment will be described with reference to the drawings.

The power supply apparatus of the present third embodiment is different from the power supply apparatus of the first and second embodiments in the configuration for connecting the first power storage unit 8, 9 and the second power storage unit 10, 11 to the DC link circuit 23.

In the power supply apparatus of the present third embodiment, the second power storage unit 10, 11 is electrically connected to the DC link circuit 23 via the first power storage unit and a DC line. The secondary battery unit 10 is connected to the capacitor 8 via the charge/discharge circuit 11. The capacitor 8 is electrically connected to a DC link circuit 23 via the charge/discharge circuit 9.

Figure 6:
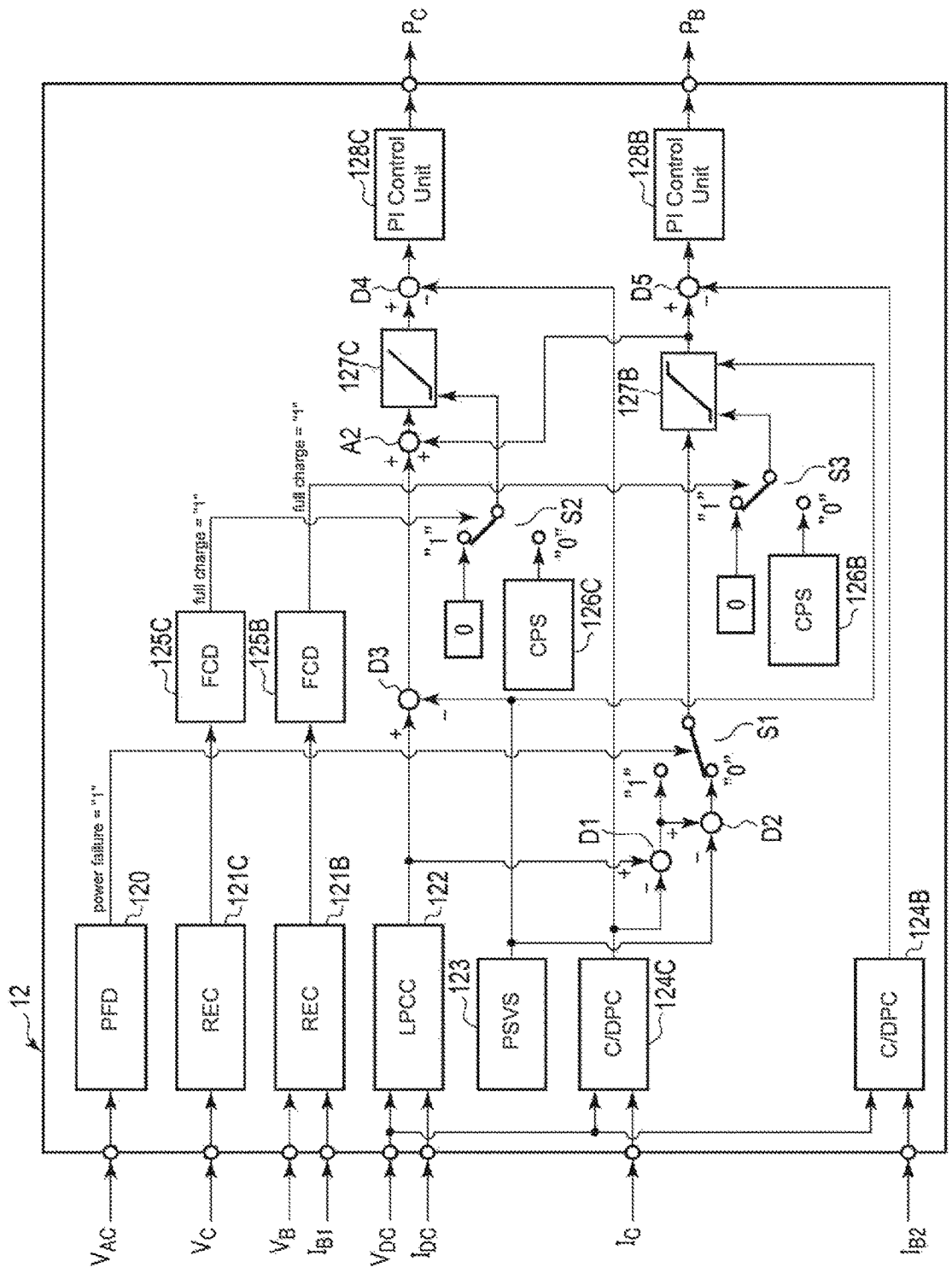
FIG. 6 is an exemplary diagram of a control circuit for the power supply apparatus of the third embodiment.

FIG. 6 is an exemplary diagram of a control circuit for the power supply apparatus of the third embodiment.

The power supply apparatus of the present third embodiment is different from the first embodiment in that the control circuit 12 includes the adder A2.

The adder A2 receives the output value of the subtractor D3 and the output value of the charge/discharge power limiter 127B, and outputs the sum of the output value of the subtractor D3 and the output value of the charge/discharge power limiter 127B. The output value of the adder A2 is input to the charge power limiter 127C.

That is, in the power supply apparatus of the present third embodiment, the value of the control signal $P_C$, to be output to the charge/discharge circuit 9 includes the value of control signal $P_B$, to the charge/discharge circuit 11. Therefore, the charge/discharge circuit 9 charges or discharges the capacitor 8 and charges or discharges the secondary battery 10 via the charge/discharge circuit 11.

In the power supply apparatus of the present third embodiment, for example, when the number of cells mounted on the secondary battery unit 10 is smaller and the voltage of the secondary battery unit 10 is lower, by connecting the terminal of the charge/discharge circuit 11 to a capacitor, the boost ratio in the secondary battery charge/discharge circuit 11 can be reduced, and the energy efficiency when charging and discharging the secondary battery unit 10 can be improved.

The power supply apparatus of the present third embodiment is the same as the power supply apparatus of the first embodiment except for the above points. That is, according to the power supply apparatus of the present third embodiment, the capacitor 8 and the secondary battery unit 10 can operate in cooperation with each other, and the energy stored in the plurality of power storage devices can be efficiently used.

Next, a power supply apparatus according to a fourth embodiment will be described with reference to the drawings.

Figure 7:
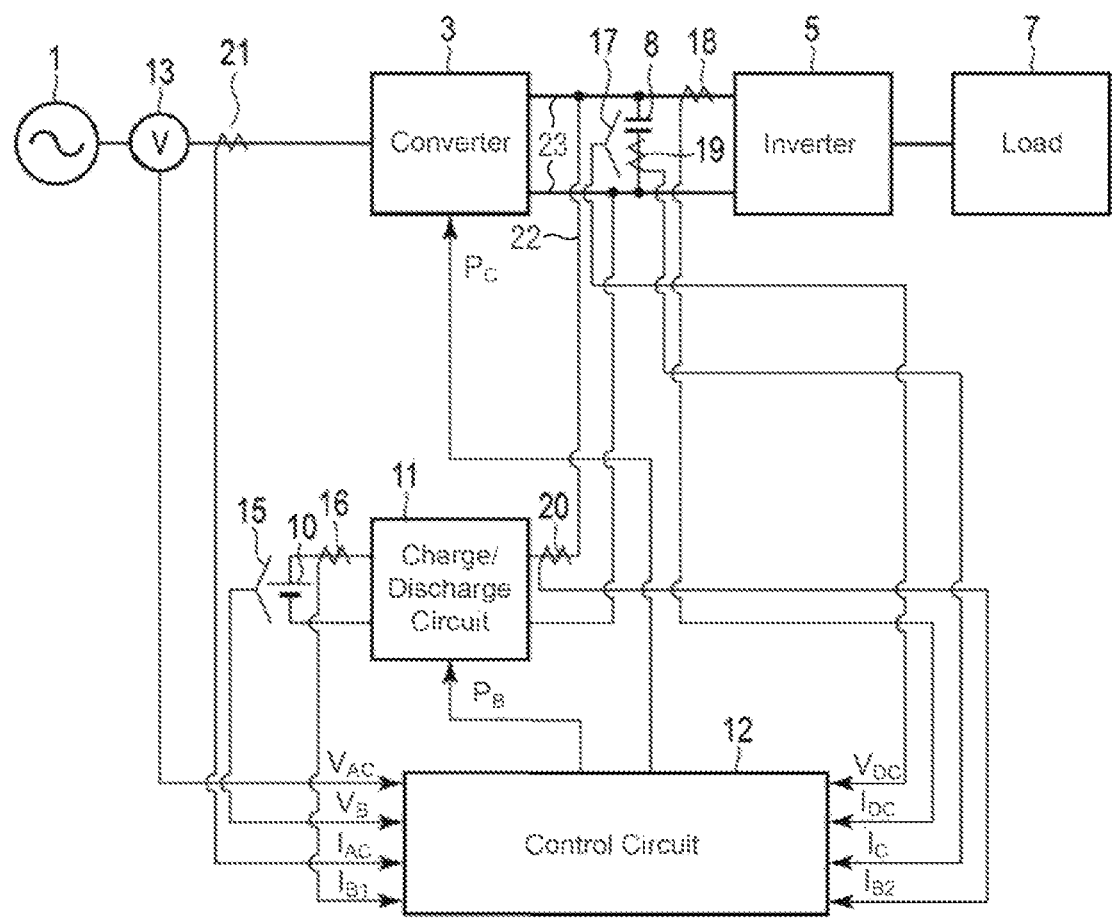
FIG. 7 is an exemplary diagram showing a power supply apparatus of a fourth embodiment.

FIG. 7 is an exemplary diagram showing a power supply apparatus of a fourth embodiment.

The power supply apparatus of the present fourth embodiment is different from the power supply apparatus of the first embodiment in that the power supply apparatus is further provided with the current detector 21, the capacitor 8 is connected in parallel to the converter 3 and the inverter 5 in the DC link circuit 23, and the power supply apparatus does not include the capacitor charge/discharge circuit 9.

The current detector 21 detects an AC current value of an alternating current supplied from commercial power supply 1 to the converter 3, and supplies detected AC current value $I_{AC}$ to control circuit 12.

The capacitor 8 is connected between the high-potential line and low-potential line of the DC link circuit 23. The current detector 19 detects a DC current value of direct current flowing between the DC link circuit 23 and the capacitor 8, and supplies the detected DC current value $I_C$ to the control circuit 12.

In the power supply apparatus of the present fourth embodiment, the control signal $P_C$ output from the control circuit 12 is input to the converter 3. The converter 3 controls power output to the DC link circuit based on the input control signal $P_C$. That is, in the power supply apparatus of the present fourth embodiment, the first power storage unit includes converter 3.

Figure 8:
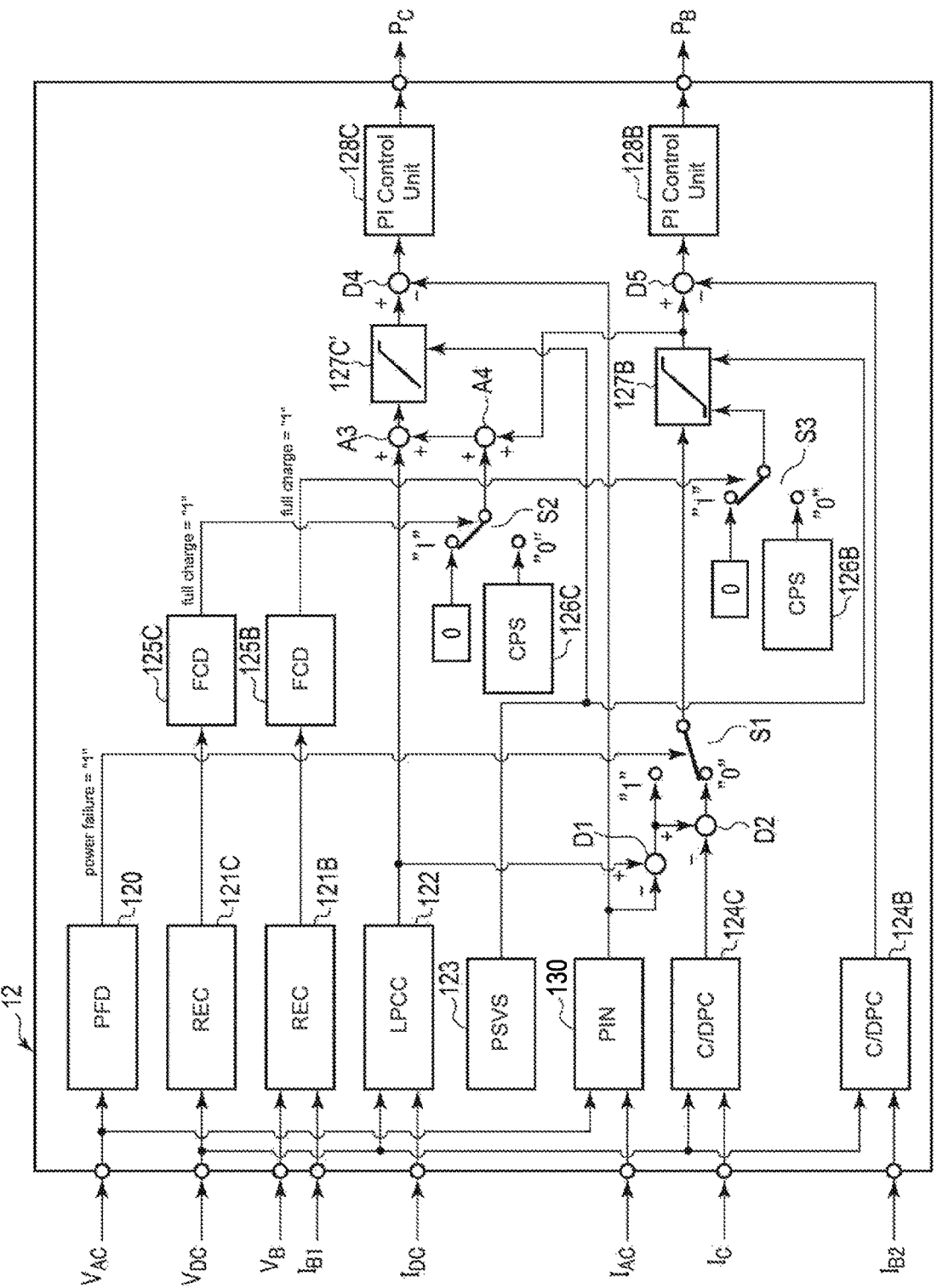
FIG. 8 is an exemplary diagram of a control circuit for the power supply apparatus of the fourth embodiment.

FIG. 8 is an exemplary diagram of a control circuit for the power supply apparatus of the fourth embodiment.

The power supply apparatus of the present fourth embodiment is different from the power supply apparatus of the first embodiment in that the control circuit 12 includes the input power calculation unit (PIN) 130 and the adders A3 and A4, and includes the rectification power limiter 127C' instead of the charge power limiter 127C.

The input power calculation unit 130 receives the AC voltage value $V_{AC}$ detected by the voltage detector 13 and the AC current value $I_{AC}$ detected by the current detector 21, calculates an AC electric power value of the AC electric power supplied from the commercial power supply 1 to the converter 3, and outputs the calculated value. The output value of the input power calculation unit 130 is input to the subtractor D1 and the subtractor D4. The input power calculation unit 130 may calculate, for example, an average value of the AC electric power for one cycle of the AC electric power and output the average value in place of the AC electric power value. In the power supply apparatus according to the present fourth embodiment, the AC electric power supplied to the converter 3 is used in a calculation described later on the assumption that the AC electric power is substantially equal to the electric power output from the converter 3. According to the assumption, a current detector to detect a current value of the direct current output from the converter 3 does not need to be installed in the power supply apparatus, and therefore the number of components of the power supply apparatus can be reduced.

The subtracter D1 outputs a difference obtained by subtracting the output value of the input power calculation unit 130 from the output value of the load power consumption calculation unit 122. The subtractor D2 outputs a difference obtained by subtracting the output value of the charge/discharge power calculation unit 124C from the output value of the subtractor D1.

Adder A4 receives the output value of switching unit S2 and the output value of charging/discharging power limit unit 127B, and outputs the sum of the output value of switching unit S2 and the output value of charge/discharge power limiter 127B.

The adder A3 receives the output value of the load power consumption calculator 122 and the output value of the adder A4, and outputs the sum of the output value of the load power consumption calculator 122 and the output value of the adder A4. That is, the output value of the adder A3 is a sum of the output value of the switching unit S2, the output value of the charge/discharge power limit unit 127B (the charge/discharge power command value of the secondary battery unit 10), and the output value of the load power calculation unit 122.

The rectification power limiter 127C' receives the peak shift value from the peak shift value setting unit 123 and the output value from the adder A3. The rectification power limiter 127C' outputs the output value from the adder A3 when the peak shift value is larger than or equal to the output value of the adder A3 to the subtractor D4, and outputs the peak shift value when the when the output value of the adder A3 is larger than the peak shift value to the subtractor D4.

The subtractor D4 outputs a difference obtained by subtracting the output value of the input power calculation unit 130 from the output value of the rectification power limiter 127C' to the PI control unit 128C.

The PI control unit 128C calculates a control signal $P_C$ such that the output value from the subtractor D4 becomes zero by executing the proportional-integral control, and outputs the control signal $P_C$ to the converter 3.

According to the configuration of the control circuit 12, when the commercial power supply 1 is operating normally, the output value from the switching unit S1 to the charge/discharge power limiter 127B is obtained by subtracting both of the output value of the input power calculation unit 130 and the output value of the charge/discharge power calculation unit 124C from the output value of load power consumption calculation unit 122. That is, when the output value from the switching unit S1 to the charge/discharge power limiter 127B is positive, it indicates that the electric power supplied by the capacitor 8 cannot make up for electric power exceeding the peak shift value, and that an absolute value of the output value of the switching unit S1 is electric power exceeding the discharge capacity of the capacitor 8. On the other hand, when the output value from the switching unit S1 is negative, it indicates that the sum of the electric power consumed by the electric load 7 and electric power used to charge the capacitor 8 does not exceed the peak shift value. In that case, an absolute value of the output value of the switching unit S1 indicates the maximum electric power that can be used to charge the secondary battery unit 10.

When the commercial power supply 1 is in the power failure condition, the output value from the switching unit S1 to the charge/discharge power limiter 127B is obtained by subtracting the output value of the input power calculation unit 130 from the output value of the load power consumption calculation unit 122. Here, when the commercial power supply 1 is in the power failure condition, the output value of the input power calculation unit 130 is substantially zero. That is, the output value from the switching unit S1 to the charge/discharge power limiter 127B indicates the electric power consumed by the electric load 7.

When the commercial power supply 1 is in the power failure condition, to the extent that the electric power supplied by the secondary battery unit 10 does not exceed the peak shift value, the charge/discharge circuit 11 controls the secondary battery unit 10 to discharge. When the electric power consumed by the electric load 7 exceeds the peak shift value, the electric power is supplied from the capacitor 8.

In a case that the commercial power supply 1 comes into power failure condition while the electric power consumed by the electric load 7 is lower than the peak shift value, the secondary battery unit 10 not only supplies the electric power to the electric load 7, but also supplies the electric power to the capacitor 8. Thus, after the commercial power supply 1 recovers from the power failure, even when the electric load 7 consumes large electric power exceeding the peak shift value, the peak shift operation can be executed by supplying electric power from the capacitor 8. Further, after the commercial power supply 1 recovers from the power failure, the secondary battery unit 10 can be charged by the electric power supplied via the DC link circuit while the electric power consumed by the electric load 7 stays under the peak shift value.

As described above, according to the power supply apparatus of the present fourth embodiment, the same effects as those of the first embodiment can be obtained. Also, according to the power supply apparatus of the present fourth embodiment, the charge/discharge circuit 9 can be omitted, and therefore the cost reduction can be realized.

In the first to fourth embodiments, each power supply apparatus includes two types of power storage units, the capacitor 8 to charge and discharge with a larger electric power and the secondary battery unit 10 to store larger amounts of energy. However, an electrolytic capacitor, a secondary battery unit, and other power storage units, capable of charging and discharging with larger electric power, can be used in the power supply apparatus in place of the capacitor 8. Also, a hydrogen energy storage unit and other storage unit, capable of storing larger amounts of energy, can be used in the power supply apparatus in place of the secondary battery unit 10.

What is claimed is:

1. A power supply apparatus, comprising:
   a control circuit;
   a converter to convert first AC electric power, received from an AC power supply, into DC electric power;
   an inverter, connected to the converter via a DC link circuit, to convert the DC electric power into second AC electric power;
   a first power storage unit, electrically connected to the DC link circuit, to supply and receive DC electric power to and from the DC link circuit; and
   a second power storage unit, having a larger electric power storing capacity than the first power storage unit and electrically connected to the DC link circuit, to supply and receive DC electric power to and from the DC link circuit;
   wherein the control circuit, while the AC power supply is in a normal condition,
      controls the first power storage unit to discharge when the control circuit detects that electric power consumption, by an external device connected to the power supply apparatus, exceeds a threshold, and
      controls at least one of the first power storage unit or the second power storage unit to charge when the control circuit detects that the electric power consumption does not exceed the threshold, and
   while the AC power supply is in an abnormal condition,
      controls the second power storage unit to discharge, and
      controls the first power unit to discharge when it is detected that the electric power consumption exceeds the threshold.

2. The power supply apparatus according to claim 1, wherein
   the control circuit, while the AC power supply is in the abnormal condition and the second power storage unit is controlled to discharge, controls the first power storage unit to charge when the control circuit detects that the electric power consumption does not exceed the threshold.

3. The power supply apparatus according to claim 1, wherein
   the first power storage unit includes a capacitor and a first charge/discharge circuit to charge and discharge the capacitor, the second power storage unit includes a secondary battery unit and a second charge/discharge circuit to charge and discharge the secondary battery unit, and the first charge/discharge circuit and the second charge/discharge circuit are connected to the DC link circuit via a common DC line.

4. The power supply apparatus according to claim 1, wherein
   the first power storage unit includes a capacitor and a first charge/discharge circuit to charge and discharge the capacitor, the second power storage unit includes a secondary battery unit and a second charge/discharge circuit to charge and discharge the secondary battery unit, the first charge/discharge circuit is connected to the DC link circuit via a DC line, and the second charge/discharge circuit is connected, via the first charge/discharge circuit, to the DC link circuit.

5. The power supply apparatus according to claim 1, wherein
   the first power storage unit includes a capacitor, the second power storage unit includes a secondary battery unit and a second charge/discharge circuit to charge and discharge the secondary battery unit, the capacitor is connected to a high-potential line and a low-potential line of the DC link circuit, and the second charge/discharge circuit are connected to the DC link circuit via a DC line.

6. A power supply apparatus, comprising:
   a control circuit;
   a first power storage unit, electrically connected to a DC link circuit, to supply and receive DC electric power to and from the DC link circuit; and
   a second power storage unit, having different characteristics from the first power storage unit and electrically connected to the DC link circuit, to supply and receive DC electric power to and from the DC link circuit;
   wherein the control circuit controls predetermined one of the first power storage unit and the second power storage unit to discharge, when the control circuit detects that electric power consumption, by an external device connected to the power supply apparatus, exceeds a threshold.

7. The power supply apparatus according to claim 6, wherein
the predetermined one of the first power storage unit and the second power storage unit has a larger power output characteristic than the other power storage unit.

8. The power supply apparatus according to claim 6, wherein
the first power storage unit includes a capacitor and a first charge/discharge circuit to charge and discharge the capacitor, and the second power storage unit includes a secondary battery unit and a second charge/discharge circuit to charge and discharge the secondary battery unit.

9. The power supply apparatus according to claim 6, wherein
the first power storage unit includes a capacitor placed between a positive line and a negative line of the DC link circuit, and the second power storage unit includes a secondary battery unit and a second charge/discharge circuit to charge and discharge the secondary battery unit.

10. A power supply method, comprising:
converting first AC electric power, received from an AC power supply, into DC electric power;
receiving by a DC link circuit, the converted DC electric power and converting the received DC electric power into second AC electric power;
supplying and receiving into a first power storage unit DC electric power to and from the DC link circuit; and
supplying and receiving into a second power storage unit, having a larger electric power storing capacity than the first power storage unit and electrically connected to the DC link circuit, DC electric power to and from the DC link circuit;
wherein while the AC power supply is in a normal condition,
controlling, by a control circuit, the first power storage unit to discharge when the control circuit detects that electric power consumption, by an external device connected to the power supply apparatus, exceeds a threshold, and controlling at least one of the first power storage unit or the second power storage unit to charge when the control circuit detects that the electric power consumption does not exceed the threshold, and
while the AC power supply is in an abnormal condition,
controlling the second power storage unit to discharge, and
controlling the first power unit to discharge when it is detected that the electric power consumption exceeds the threshold.

11. The power supply method according to claim 10, wherein
the controlling, while the AC power supply is in the abnormal condition and the second power storage unit is controlled to discharge, controls the first power storage unit to charge when the control circuit detects that the electric power consumption does not exceed the threshold.

12. The power supply method according to claim 10, wherein
the first power storage unit includes a capacitor and a first charge/discharge circuit to charge and discharge the capacitor, the second power storage unit includes a secondary battery unit and a second charge/discharge circuit to charge and discharge the secondary battery unit, and the first charge/discharge circuit and the second charge/discharge circuit are connected to the DC link circuit via a common DC line.

13. The power supply method according to claim 10, wherein
the first power storage unit includes a capacitor and a first charge/discharge circuit to charge and discharge the capacitor, the second power storage unit includes a secondary battery unit and a second charge/discharge circuit to charge and discharge the secondary battery unit, the first charge/discharge circuit is connected to the DC link circuit via a DC line, and the second charge/discharge circuit is connected, via the first charge/discharge circuit, to the DC link circuit.

14. The power supply method according to claim 10, wherein
the first power storage unit includes a capacitor, the second power storage unit includes a secondary battery unit and a second charge/discharge circuit to charge and discharge the secondary battery unit, the capacitor is connected to a high-potential line and a low-potential line of the DC link circuit, and the second charge/discharge circuit are connected to the DC link circuit via a DC line.

15. The power supply method according to claim 10, wherein
the first power storage unit has a larger power output characteristic than the second other power storage unit.

* * * * *

UNITED STATES PATENT AND TRADEMARK OFFICE
CERTIFICATE OF CORRECTION

PATENT NO. : 11,258,290 B2  
APPLICATION NO. : 16/998331  
DATED : February 22, 2022  
INVENTOR(S) : Yukitaka Monden et al.

Page 1 of 1

It is certified that error appears in the above-identified patent and that said Letters Patent is hereby corrected as shown below:

On the Title Page

Item (73), should read:  
--(73) Assignees: KABUSHIKI KAISHA TOSHIBA, Minato-ku (JP);  
TOSHIBA INFRASTRUCTURE SYSTEMS & SOLUTIONS CORPORATION, Kawasaki (JP)--

Signed and Sealed this  
Seventeenth Day of May, 2022

Katherine Kelly Vidal  
*Director of the United States Patent and Trademark Office*